United States Patent
Steen et al.

(10) Patent No.: US 8,171,037 B1
(45) Date of Patent: May 1, 2012

(54) SYSTEM AND METHOD FOR REFERENCE NUMBER EXPANSION

(75) Inventors: Scott Steen, Bryan, TX (US); Keith Wilson, San Antonio, TX (US); James Lutz, Pipe Creek, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 894 days.

(21) Appl. No.: 11/461,728

(22) Filed: Aug. 1, 2006

(51) Int. Cl.
*G06F 17/30* (2006.01)

(52) U.S. Cl. ............... 707/756; 341/58; 341/59; 341/63

(58) Field of Classification Search ........... 707/E17.074, 707/822, 796, 756
See application file for complete search history.

(56) References Cited

U.S. PATENT DOCUMENTS

| | | | |
|---|---|---|---|
| 6,526,292 B1 * | 2/2003 | Henry, Jr. ................. | 455/563 |
| 6,668,373 B1 * | 12/2003 | Wattenburg ............... | 717/159 |
| 6,907,435 B2 * | 6/2005 | Coulson et al. ............ | 707/203 |
| 2003/0144013 A1 * | 7/2003 | Benchetrit et al. ......... | 455/461 |

OTHER PUBLICATIONS

Microsoft Computer Dictionary, 5th Edition, May 1, 2002, pp. 1-3.*
American Idol 2 grand finale to air on Tuesday May 20 & Wednesday May 21, 2003, pp. 1-3.*
"The Numbers Connection, Managing the Various Numeric Formats," [online], Copyright 1987 [retrieved on Jan. 26, 2007]. pp. 1-7. Retrieved from the Internet: <URL: http://www.simotime.com/indexnum.htm>.
"Converting numbers to alphanumeric strings using a BUILTIN function," [online], Jun. 27, 1997 [retrieved on Jan. 26, 2007]. p. 1. Retrieved from the Internet: <URL: http://www.lansa.com/support/tips/t0072.htm>.
Grimes, Robin G., "Incrementing an Alpha-Numeric Number," [online], Jun. 27, 1997 [retrieved on Jan. 26, 2007]. pp. 1-4. Retrieved from the Internet: <URL: http://www.15seconds.com/howto/pg001041.htm>.
WordIQ ASCII Codes, 2005, pp. 1-10.
Bell Star Codes, 2000. http://web.archive.org/web/20000229194625/http://www.yashy.com/star.codes.html. Accessed Sep. 25, 2008. 1 page.
Durda, EBCDIC Character Code Reference, 2002. http://web.archive.org/web/20021029012447/http://nemesis.lonestar.org/reference/telecom . . . Accessed Sep. 25, 2008. 3 pages.
UNITS Telephone Star Codes, 2005. http://web.archive.org/web/20050224082713/http://8help.osu.edu/2264.html. Accessed Sep. 25, 2008. 2 pages.

* cited by examiner

*Primary Examiner* — John E Breene
*Assistant Examiner* — Albert Phillips, III
(74) *Attorney, Agent, or Firm* — Brooks, Cameron & Huebsch PLLC

(57) ABSTRACT

Method and system are disclosed for expanding a reference number range without altering existing data storage length. Such reference numbers may include employee numbers, social security numbers, customer account numbers, and the like. The method/system takes advantage of the way decimal numbers are stored by computers to allow text to be used in numeric reference numbers. In one implementation, letters A-Z are used for the leftmost position, increasing the domain count of reference numbers from 10 to 36 for that position. A reference number expansion utility is then used to convert the additional reference numbers to and from the existing data storage format.

18 Claims, 5 Drawing Sheets

EXPAND ID NUMBER

SYSTEM AND METHOD FOR REFERENCE NUMBER EXPANSION

CROSS-REFERENCE TO RELATED APPLICATION

This application is related to in subject matter, and incorporates herein by reference, co-pending U.S. patent application Ser. No. 11/461,732 entitled "SYSTEM AND METHOD FOR REFERENCE NUMBER EXPANSION," filed Aug. 1, 2006.

TECHNICAL FIELD

The disclosed embodiments relate generally to the use of reference numbers and, more particularly, to a system and method for increasing the available range of unique reference numbers without increasing data storage requirements.

BACKGROUND

Most organizations (e.g., public corporations, private companies, government agencies, educational institutions, etc.), regardless of size and type, rely on one or more reference numbers in various aspects of their operation. Examples of reference numbers that are commonly used include identification (ID) numbers, account numbers, product inventory codes, and the like. The reference numbers allow information management systems and other computer-based applications within these organizations to locate, retrieve, organize, and otherwise manipulate data for the organizations. Indeed, without such reference numbers, it would be difficult for these organizations to carry out even simple or routine tasks in many cases.

Unfortunately, unanticipated problems sometime arise with respect to the reference numbers. For example, organizations that set up their reference numbering system using one particular technology may later see their hardware and/or software rendered obsolete by advances in technology. Other problems may come about simply as a result of necessary diversification in a competitive market. For example, the original designers of the system simply did not intend for it to handle the types of products currently offered by the organization.

One particular problem that may arise is depletion of unique reference numbers. For example, an organization that uses a 5-digit employee ID number only has 100,000 unique values with which to work. As the organization continues to hire employees over time, the number of available unique employee IDs will be exhausted. A temporary solution for this shortage is to reuse already expired or retired employee ID numbers. However, in addition to being only a short-term fix, reuse may create other problems for the organization's data processing and information management systems. For example, an expired or retired employee ID number may be confused or mistaken in some systems for the ex-employee to whom the expired employee ID number was previously assigned Alternatively, for employee ID numbers that are purely numeric, text may be used to expand the range of possible numbers. Unfortunately, many organizations decided early on to store their employee ID numbers and other numeric reference numbers using a data storage format having a fixed length in order to conserve data storage space. An example of such a format is binary coded decimal (BCD), also called packed numbers in some computer programming languages (e.g., COBOL). As is commonly known in the art, a BCD number may be represented using only four bits (nibble), whereas text requires a full byte. To allocate a full byte for text in a BCD storage format would render it inoperable in many cases.

Accordingly, what is needed is a way to increase the range of an organization's available unique reference numbers. More particularly, what is needed is a way to increase the range of an organization's available unique reference numbers without altering existing data storage size requirements.

SUMMARY

The disclosed embodiments are directed to a method and system for expanding a reference number range without altering existing data storage size requirements. Such reference numbers may include employee numbers, social security numbers, customer account numbers, and the like. The method/system takes advantage of the way decimal numbers are stored by computers to allow text to be used in numeric reference numbers. In one implementation, letters A-Z are used in the numeric reference numbers. The letters increase the total available reference numbers by at least an order of magnitude. A reference number expansion utility is then used to convert the additional reference numbers to and from the existing data storage length.

BRIEF DESCRIPTION OF THE DRAWINGS

The foregoing and other advantages will become apparent from the following detailed description and upon reference to the drawings, wherein.

DETAILED DESCRIPTION

Following is a detailed description with reference to the drawings wherein the same reference labels are used for the same or similar elements. Throughout this description and the claims, the terms "a" and "an" are intended to mean "one or more."

As mentioned above, reference numbers that have a fixed number of digits will likely exceed their upper limits as an organization continues to grow. For example, a 5-digit reference number can only support values from 00000 to 99999. One way for the organization to expand this range and still keep the reference number at the same length is to allow text to be used in addition to numbers. Unfortunately, many organizations store their reference numbers using a fixed-length data storage format, such as BCD, in order to minimize data storage space. As is well known in the art, a data storage format based on BCD does not readily support the use of text.

The embodiments disclosed herein allow an organization to expand the range of unique reference numbers that are available with a fixed-length data storage format. The disclosed embodiments allow the organization to use text in previously numeric reference numbers without altering the existing data storage length. In one embodiment, the organization is permitted to use text for the lead position in the previously numeric reference numbers. A reference number expansion utility may then be used to determine whether the reference number is numeric or alphanumeric, and process the reference number accordingly.

Figure 1:
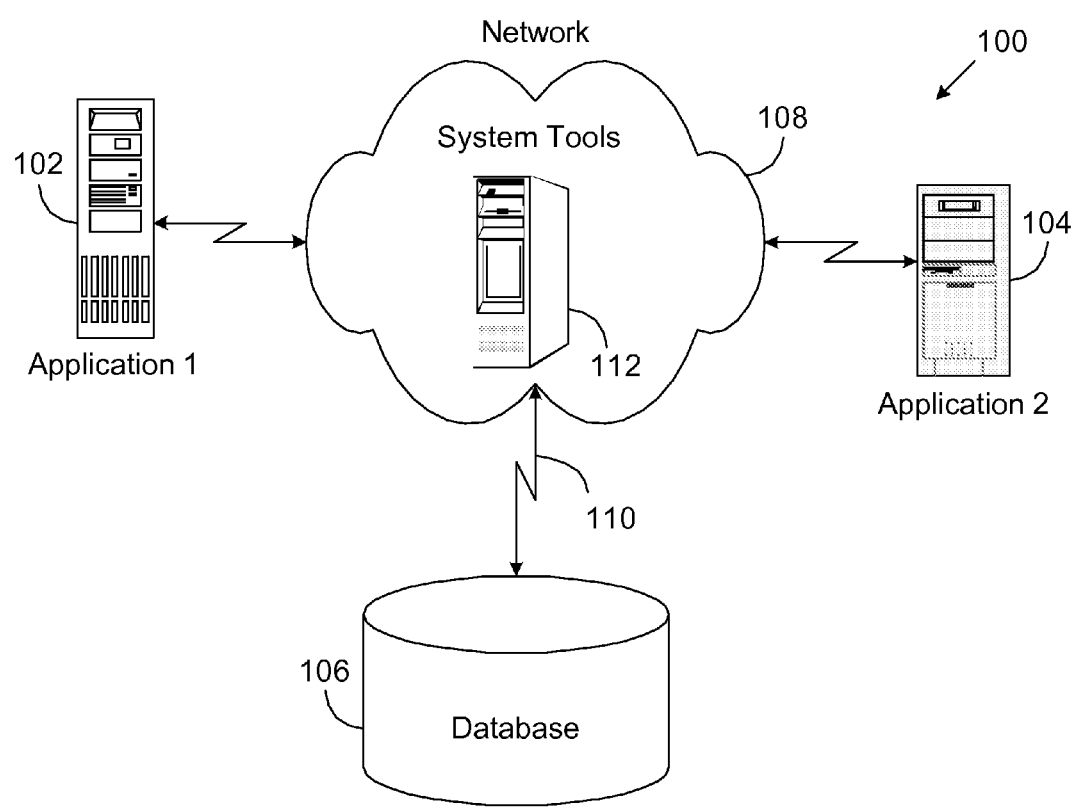
FIG. 1 illustrates an exemplary organization that uses expanded reference numbers according to the disclosed embodiments.

Referring to FIG. 1, a partial view of an exemplary organization 100 is shown in which expanded reference numbers according to the disclosed embodiments are used. The organization 100 may be any type of organization, including a public corporation, private company, government agency, educational institution, and the like. In addition, the organization 100 may have facilities located in a central location and/or spread over several regions. In the latter case, the organization 100 may be a national organization or it may be an international organization.

Within the organization 100 are a plurality of applications 102 and 104 that are connected to a database 106 over a network 108 via network connections 110. A collection of system tools 112, including connection tools, communication tools, data conversion tools, database tools, and the like, are provided on the network 108 to facilitate interaction between the applications 102 and 104 and the database 106. The network connections 110 may be any suitable network connections known to those having ordinary skill in the art, including wired and wireless Ethernet connections. The network 108 itself may be a local area network (LAN) that is in turn connected to a wide area network (WAN), and/or it may be private network (intranet) that is in turn connected to a public network (the Internet). As for the applications 102 and 104, these may be any type of applications that use or otherwise access information using reference numbers. Examples of such applications include human resources (HR) applications, financial services applications, inventory tracking applications, and the like. Similarly, the database 106 may be any suitable type of database known in the art, including an HR database, a financial services database, a product inventory database, and the like.

In the present example, the database 106 is an HR database that stores a variety of HR type information, including employee names, dates of birth, employee ID numbers, employment dates, citizenship, and the like. This information may then be accessed by authorized users within the organization 100 using various applications, such as the applications 102 and 104 mentioned above. When changes are made to this information, or when new information is added, the database 106 stores the employee ID number of the person making the change or addition. To conserve data storage space, the database 106 has been designed to use BCD to store employee ID numbers. The employee ID numbers in the present example are 5-digit numeric numbers and, as will be explained below, the database 106 stores them using only three bytes of data storage space instead of five.

In accordance with the disclosed embodiments, the same three bytes of data storage space used in the database 106 for 5-digit numeric employee ID numbers may also be used for the expanded employee ID numbers. An ID expansion utility may then be included among the system tools 112 for converting the expanded employee ID numbers to fit within the 3-byte data storage format. Thus, both numeric and expanded employee ID numbers may be stored using the same 3-byte data storage format. In one embodiment, the employee ID numbers are expanded by permitting letters A-Z to be used in the lead (leftmost) position of the employee ID number in addition to numbers 0-9. Preferably uppercase text is used, but lowercase text may also be used without an undue number of modifications to the disclosed embodiments. In any event, the inclusion of letters A-Z increases the range of possible employee ID numbers in this example from around 100,000 to around at least 2,600,000.

It should be noted in the above description that, although only 5-digit reference numbers were mentioned, the disclosed embodiments are fully applicable to reference numbers having a larger number of digits (e.g., 9 digits, 15 digits, etc.). In addition, although specific types of reference numbers were mentioned, such as employee ID numbers, the disclosed embodiments are fully applicable to other types of reference numbers, including social security numbers, customer account numbers, product inventory numbers, and the like. Furthermore, although only letters are used in the expanded reference numbers, it is certainly possible to employ special characters in addition to letters. Finally, although only the lead position in the expanded reference numbers contains text, it is certainly possible for other positions to also contain text, depending on the particular application.

Figure 2:
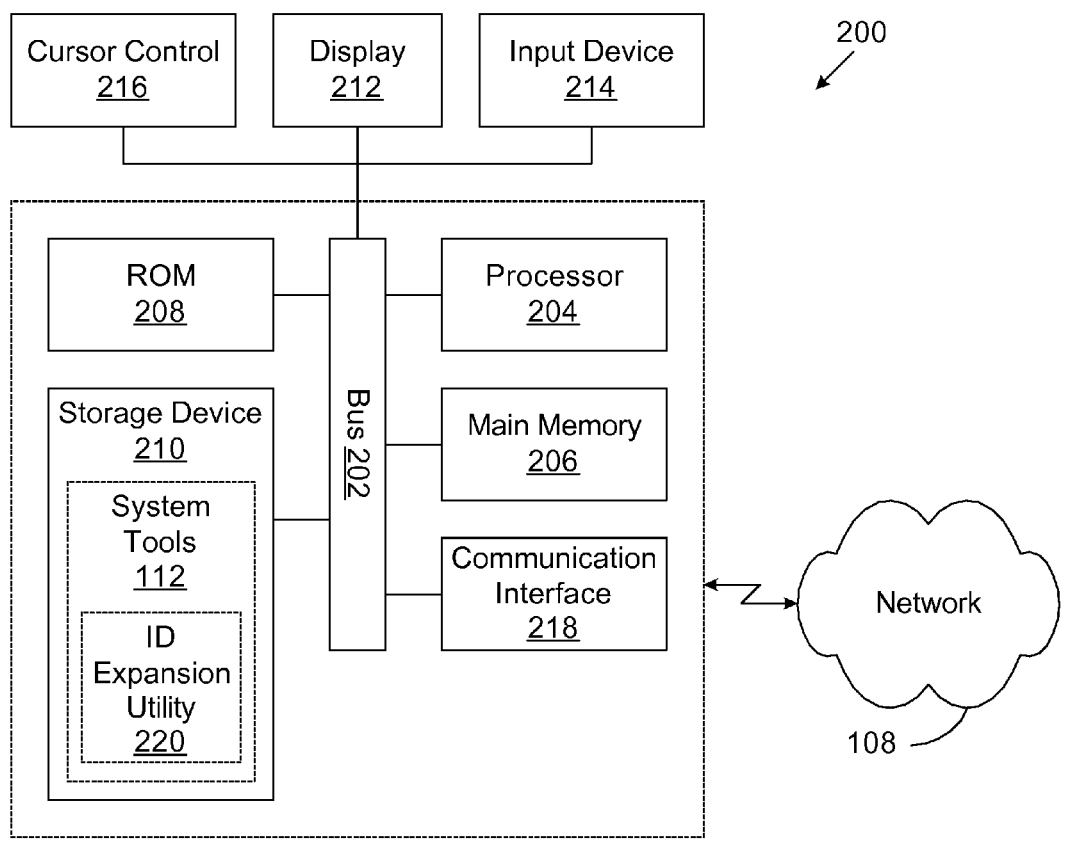
FIG. 2 illustrates an exemplary computing system for implementing expanded reference numbers according to the disclosed embodiments.

FIG. 2 illustrates an exemplary computer system 200 that may be used to execute the various system tools 112. In one embodiment, the computer system 200 is a server hosting the various tools 112 for the organization 100, including the ID expansion utility, that are accessible by the applications 102 and 104 via the network 108. The computer system 200 may include a bus 202 or other communication mechanism for communicating information and a processor 204 coupled with the bus 202 for processing information. The computer system 202 also includes a main memory 206, such as a random access memory (RAM) or other dynamic storage device, coupled to the bus 202 for storing computer-readable instructions to be executed by the processor 204. The main memory 206 also may be used for storing temporary variables or other intermediate information during execution of the instructions to be executed by the processor 204. The computer system 200 further includes a read-only memory (ROM) 208 or other static storage device coupled to the bus 202 for storing static information and instructions for the processor 204. A computer-readable storage device 210, such as a magnetic disk or optical disk, is coupled to the bus 202 for storing information and instructions for the processor 204.

The computer system 200 may be coupled via the bus 202 to a display 212, such as a cathode ray tube (CRT), for displaying information to a user. An input device 214, including, for example, alphanumeric and other keys, is coupled to the bus 202 for communicating information and command selections to the processor 204. Another type of user input device is a cursor control 216, such as a mouse, a trackball, or cursor-direction keys for communicating direction information and command selections to the processor 204 and for controlling cursor movement on the display 212. The cursor control 216 typically has two degrees of freedom in two axes, a first axis (e.g., x) and a second axis (e.g., y), that allow the device to specify positions in a plane.

The term "computer-readable instructions" as used above refers to any instructions that may be performed by the processor 204 and/or other component. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 210. Volatile media include dynamic memory, such as the main memory 206. Transmission media include coaxial cables, copper wire and fiber optics, including wires of the bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer system 200 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer system 200 may also include a communication interface 218 coupled to the bus 202. The communication interface 218 provides a two-way data communication coupling between the computer system 200 and the network 108. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. In any such implementation, the communication interface 218 sends and receives electrical, electromagnetic, optical, or other signals that carry digital data streams representing various types of information.

In some embodiments, the system tools 112, including an ID expansion utility 220, are installed on the computer system 200, for example, on the storage device 210. The ID expansion utility 220 may then be invoked as needed by the applications 102 and 104 over the network 108. In one embodiment, the ID expansion utility 220 may be used to conform or compress a 5-position expanded employee ID number received from the applications 102 and 104 to a number that fits within a 3-byte data storage format. The 3-byte employee ID number may then be stored in the database 106 or otherwise used to retrieve ID related information from the database 106. The ID expansion utility 220 may also be used to convert or expand a 3-byte employee ID number retrieved from the database 106 to a 5-position expanded employee ID number. The expanded employee ID number may then be passed to the requesting applications 102 and 104 along with requested ID related information, if any. In some embodiments, the ID expansion utility 220 may also be used by the applications 102 and 104 to validate the expanded employee ID numbers, for example, to ensure they are within a certain range.

Figure 3:
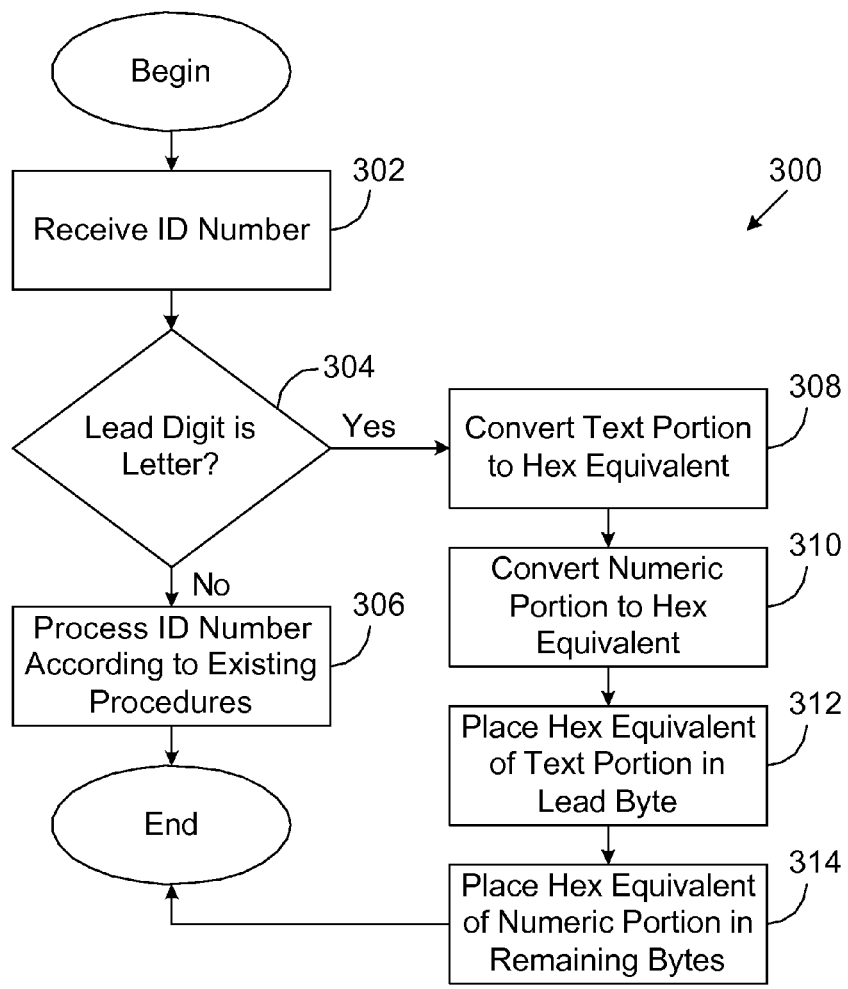
FIG. 3 illustrates an exemplary method for processing expanded reference numbers according to the disclosed embodiments.

FIG. 3 illustrates an exemplary method 300 that may be performed using the ID expansion utility 220 to conform or compress an expanded employee ID number into the existing 3-byte data storage format of the database 106. It should be noted that, although the method 300 is shown as composed of a series of discrete steps, those having ordinary skill in the art will understand that two or more steps may be combined into a single step, and that one or more individuals steps may be divided into several component steps. In addition, although the steps are shown as being performed in a particular sequence, those having ordinary skill in the art will understand that the sequence is exemplary only, and that a different sequence may certainly be used. Moreover, unless expressly stated otherwise, one or more steps of the method 300 may be performed by either the ID expansion utility 220 or one or more of the system tools 112.

The method begins at step 302, where the ID expansion utility 220 receives an employee ID number from one of the applications 102 and 104, for example, as part of a request to access information in the database 106. The employee ID number may be received by the ID expansion utility 220 as a 5-character string or it may be received as a 5-digit string, depending on the specifics of the applications 102 and 104. In the case of an expanded employee ID number, the ID number must be received as a 5-character string. The ID expansion utility 220 then determines at step 304 whether the lead position in the employee ID number is text. If the lead position is not text, then the employee ID number is processed according to the organization's existing procedures at step 306.

If it turns out that the lead position is text, then at step 308, the ID expansion utility 220 converts the text portion of the employee ID number to its hexadecimal equivalent (e.g., ASCII or EBCDIC). The ID expansion utility 220 thereafter converts the numeric decimal portion of the employee ID number to its hexadecimal equivalent at step 310. The hexadecimal equivalent of the text portion is then placed in the lead byte of the 3-byte data storage format at step 312, and the hexadecimal equivalent of the numeric decimal portion is placed in the remaining bytes at step 314. Because the entire numeric decimal portion of the received employee ID number is processed as one value (as opposed to four individual digits), it easily fits within the remaining bytes of the 3-byte data storage format. The resulting 3-byte hexadecimal number may then be stored in or otherwise used to update the database 106.

In some embodiments, instead of converting to hexadecimal equivalents, the text and numeric decimal portions of the employee ID number may be stored directly in the database 106 in their respective binary forms, since that is how their hexadecimal equivalents are ultimately stored. Thus, the hexadecimal conversions in steps 308 and 310 may be avoided altogether in some embodiments. Still, it may be useful in some cases to view and process the text and numeric decimal portion of the employee D number in hexadecimal form before storing them in their binary form in the database 106.

Following is one exemplary implementation of the above method. The exemplary implementation uses a sample the data that may be stored in the database 106, shown in Table 1. As can be seen in Table 1, each row in the database 106 includes the names, employee ID numbers, dates of birth, as well as other HR related information for the employees of the organization 100. Also stored is the employee ID number of the last person who modified the information contained in each row. This arrangement allows changes to the database 106 to be tracked for security and quality control purposes.

TABLE 1

| Name | Employee ID | Date of Birth | ... | Last Modified by |
|---|---|---|---|---|
| Joe Jones | 82345 | Feb. 14, 1960 | ... | A2345 |
| ... | ... | ... | ... | ... |
| John Smith | A2345 | Dec. 25, 1980 | ... | 91367 |

In the example shown, Joe Jones has a 5-position numeric employee ID number while John Smith has a 5-position expanded employee ID number that includes the letter "A" in the first position. Both employee ID numbers, however, may be stored using the existing BCD 3-byte data storage format of the database 106 in accordance with the disclosed embodiments. To see this more clearly, it is useful to first understand how Joe Jones' employee ID number is stored in the BCD 3-byte data storage format. Table 2 below lists BCD representations for each of the possible decimal numbers in the BCD data storage format (hexadecimal equivalents are also shown for completeness).

TABLE 2

| Bin | Dec | Hex |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 |  | A |
| 1011 |  | B |
| 1100 |  | C |
| 1101 |  | D |
| 1110 |  | E |
| 1111 |  | F |

Because each BCD representation only takes up four bits, Joe Jones' 5-position numeric employee ID number, "82345," may be stored using three bytes instead of five, in accordance with the existing BCD data storage format. This can be seen in Table 3, where the five digits use only five nibbles, which is actually less than three bytes. The sixth nibble is a sign indicator that indicates whether the number is a positive or a negative value (e.g., "1100" for positive, "1101" for negative). The reason the sign indicator is needed is because certain binary numbers may be interpreted as either a positive or a negative number because of the way computers store and process numbers. This concept is well known to those having ordinary skill in the art and is therefore mentioned only briefly here. In general, if the most significant bit (i.e., leftmost) in a given binary number is "1," the number is susceptible to interpretation as a negative number. On the other hand, a "0" in the most significant bit is almost always interpreted as a positive number. For example, the binary number "01111111" is usually interpreted as 127, whereas "11111111" may be interpreted as either 255 or −1. Therefore, to ensure correct interpretation, many computer-based applications use a sign indicator to indicate whether a number is positive or negative.

TABLE 3

| Byte 1 | | Byte 2 | | Byte 3 | |
|---|---|---|---|---|---|
| 8 | 2 | 3 | 4 | 5 | sign |
| 1 0 0 0 | 0 0 1 0 | 0 0 1 1 | 0 1 0 0 | 0 1 0 1 | 1 1 0 0 |

John Smith's expanded employee ID number, however, is not processed using the existing BCD data storage format. When John Smith's expanded employee ID number, "A2345," is received by the ID expansion utility 220, the ID expansion utility 220 detects that there is text in the lead position. Such detection may be performed using any technique known to those having ordinary skill in the art and need not be described here. The ID expansion utility 220 subsequently converts the text portion of the employee ID number to its hexadecimal equivalent (C1xh for EBCDIC) and also converts the numeric decimal portion to its hexadecimal equivalent (0929xh). The hexadecimal equivalent for the text portion is thereafter placed in the lead byte of the 3-byte data storage format, while the hexadecimal equivalent of the numeric decimal portion is placed in the remaining bytes. This can be seen below in Table 4, where the sequence "11000001" in Byte 1 is the binary representation of C1xh and the sequence "0000100100101001" in Bytes 2-3 is the binary representation of 0929xh.

TABLE 4

| Byte 1 | | Byte 2 | | Byte 3 | |
|---|---|---|---|---|---|
| C | 1 | 0 | 9 | 2 | 9 |
| 1 1 0 0 | 0 0 0 1 | 0 0 0 0 | 1 0 0 1 | 0 0 1 0 | 1 0 0 1 |

Thus, John Smith's text-based 5-position expanded employee ID number has now been made to fit within the organization's existing 3-byte data storage format. Note that processing the numeric decimal portion of the expanded employee ID as one number has caused the sign indicator to be no longer needed. This is because all available values for the numeric decimal portion result in binary numbers that have a "0" in the most significant bit. To illustrate, the highest possible value for the numeric decimal portion, 9999 (or 270Fxh), has a binary number equivalent of "0010011100001111," which has a "0" in the most significant bit. As explained previously, these binary numbers are almost always interpreted as positive numbers. A negative binary number would not result until the value of the numeric decimal portion reaches 32768 (or 8000xh), which could never happen with only four digits. Therefore, the bits that were previously reserved for the sign indicator are no longer needed and may now be applied to the numeric decimal portion.

As mentioned above, it is also possible to store the text and numeric decimal portions of the expanded employee ID number directly in binary without first converting to hexadecimal, since that is how they are ultimately stored in the database 106. This can be seen in Table 5 below, where the letter "A" (193 in EBCDIC) and the numeric decimal portion "2345" are stored directly as binary numbers in the lead byte and the remaining bytes, respectively, of the BCD data storage format. Thus, the conversion beforehand to hexadecimal may be entirely omitted in some cases. Still, it may be desirable to view the expanded employee ID number in hexadecimal form in the manner shown in Table 4. Indeed, the representation in Table 4 resembles a form of binary coded hexadecimal and may be more conveniently processed as such, insofar as each hexadecimal digit lines up with its binary counterpart.

TABLE 5

| Byte 1 | Byte 2 | Byte 3 |
|---|---|---|
| 193 | 2345 | |
| 1 1 0 0 0 0 0 1 | 0 0 0 0 1 0 0 1 0 0 1 0 1 0 0 1 | |

Figure 4:
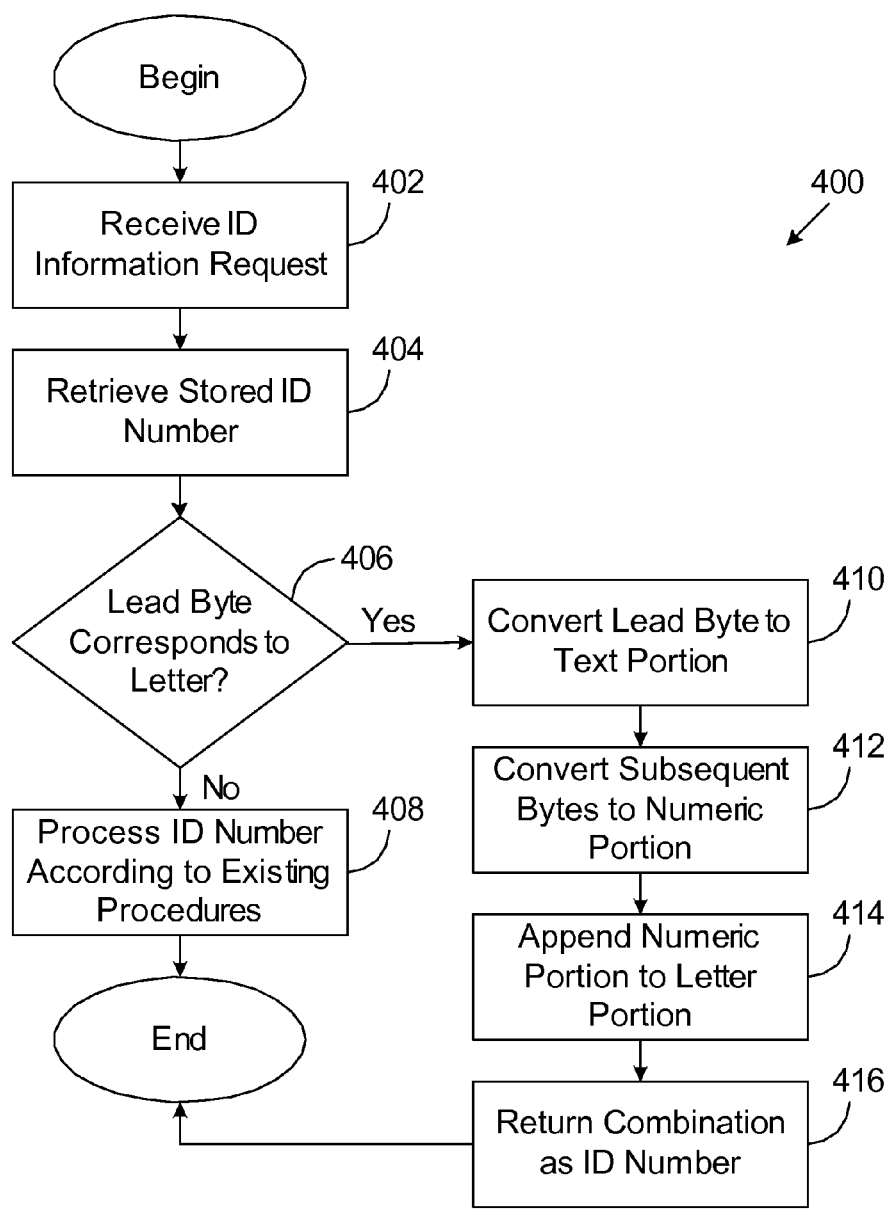
FIG. 4 illustrates an exemplary method for retrieving expanded reference numbers according to the disclosed embodiments.

The description thus far has focused primarily on conforming or compressing expanded employee ID numbers to fit within the existing BCD data storage format of the database 106. In some embodiments, however, the ID expansion utility 220 may also be used to extract or expand expanded employee ID numbers retrieved from the database 106. FIG. 4 illustrates an exemplary method 400 that may be performed using the ID expansion utility 220 to expand employee ID numbers retrieved from the database 106. As with the method 300 (FIG. 3), the ordering of the steps in the method 400 is amenable to modification by those having ordinary skill in the art, as is the discrete nature of each step.

The method 400 begins at step 402, where an information request is made by one of the applications 102 and 104, for example, to determine the last person to modify Joe Jones' information in the database 106. In response to the request, the employee ID number of the last person to modify Joe Jones' information is retrieved from the database 106 and passed to the ID expansion utility 220 at step 404. At this point, the employee ID number is still in the form of a 3-byte hexadecimal number (although it is also possible to pass a 3-byte binary equivalent of the employee ID number to the ID expansion utility 220). At step 406, the ID expansion utility 220 determines whether the hexadecimal number in the lead byte of the employee ID number corresponds to a letter. If the lead byte does not correspond to a letter, the employee ID number is processed according to the organization's existing procedures at step 408.

If the hexadecimal number in the lead byte does correspond to a letter, the ID expansion utility 220 converts the hexadecimal number (ASCII or EBCDIC) to an equivalent letter at step 410. This letter becomes the text portion of the reference number. The ID expansion utility 220 then converts the hexadecimal number in the subsequent bytes to an equivalent decimal number at step 412. This decimal number becomes the numeric decimal portion of the reference number. The ID expansion utility 220 thereafter appends the numeric decimal portion to the text portion at step 414 and passes the combination to the requesting application 102 or 104 at step 416. In the present example, the employee ID number is passed to the requesting application 102 or 104 as a 5-character string because of the text in the lead byte. Purely numeric employee ID numbers, however, may be passed as either a 5-character string or a 5-digit string, depending on the specifics of the applications 102 and 104.

In addition to compressing and expanding the expanded employee ID numbers to and from a 3-byte data storage format, in some embodiments, the ID expansion utility 220 also checks to make sure the expanded employee ID numbers are within an allowed range. Because of the way computers sort letters and number in ASCII and EBCDIC, the upper and lower limits of the expanded employee ID numbers are not inherently intuitive. Table 6 lists the ASCII and EBCDIC codes for the numbers and letters that may be used for the lead position of the expanded employee ID numbers.

TABLE 6

| Char | ASCII (hex) | EBCDIC (hex) |
|---|---|---|
| Space | 20 | 40 |
| 0 | 30 | F0 |
| 1 | 31 | F1 |
| 2 | 32 | F2 |
| 3 | 33 | F3 |
| 4 | 34 | F4 |
| 5 | 35 | F5 |
| 6 | 36 | F6 |
| 7 | 37 | F7 |
| 8 | 38 | F8 |
| 9 | 39 | F9 |
| A | 41 | C1 |
| B | 42 | C2 |
| C | 42 | C2 |
| D | 44 | C4 |
| E | 45 | C5 |
| F | 46 | C6 |
| G | 47 | C7 |
| H | 48 | C8 |
| I | 49 | C9 |
| J | 4A | D1 |
| K | 4B | D2 |
| L | 4C | D2 |
| M | 4D | D4 |
| N | 4E | D5 |
| O | 4F | D6 |
| P | 50 | D7 |
| Q | 51 | D8 |
| R | 52 | D9 |
| S | 52 | E2 |
| T | 54 | E2 |
| U | 55 | E4 |
| V | 56 | E5 |
| W | 57 | E6 |
| X | 58 | E7 |
| Y | 59 | E8 |
| Z | 5A | E9 |

As can be determined from the above table, for a 5-position expanded employee ID number, "00001" is the lowest allowed value in ASCII, whereas "A0001" is the lowest allowed value in EBCDIC. Similarly, "Z9999" is the highest allowed value in ASCII, whereas "99999" is the highest allowed value in EBCDIC. Thus, depending on the particular coding used (ASCII or EBCDIC), the lower and upper limits of the allowed range will be different. Therefore, in accordance with the disclosed embodiments, the ID expansion utility 220 may be invoked to check the expanded employee ID number to ensure it is in the allowed range.

Figure 5:
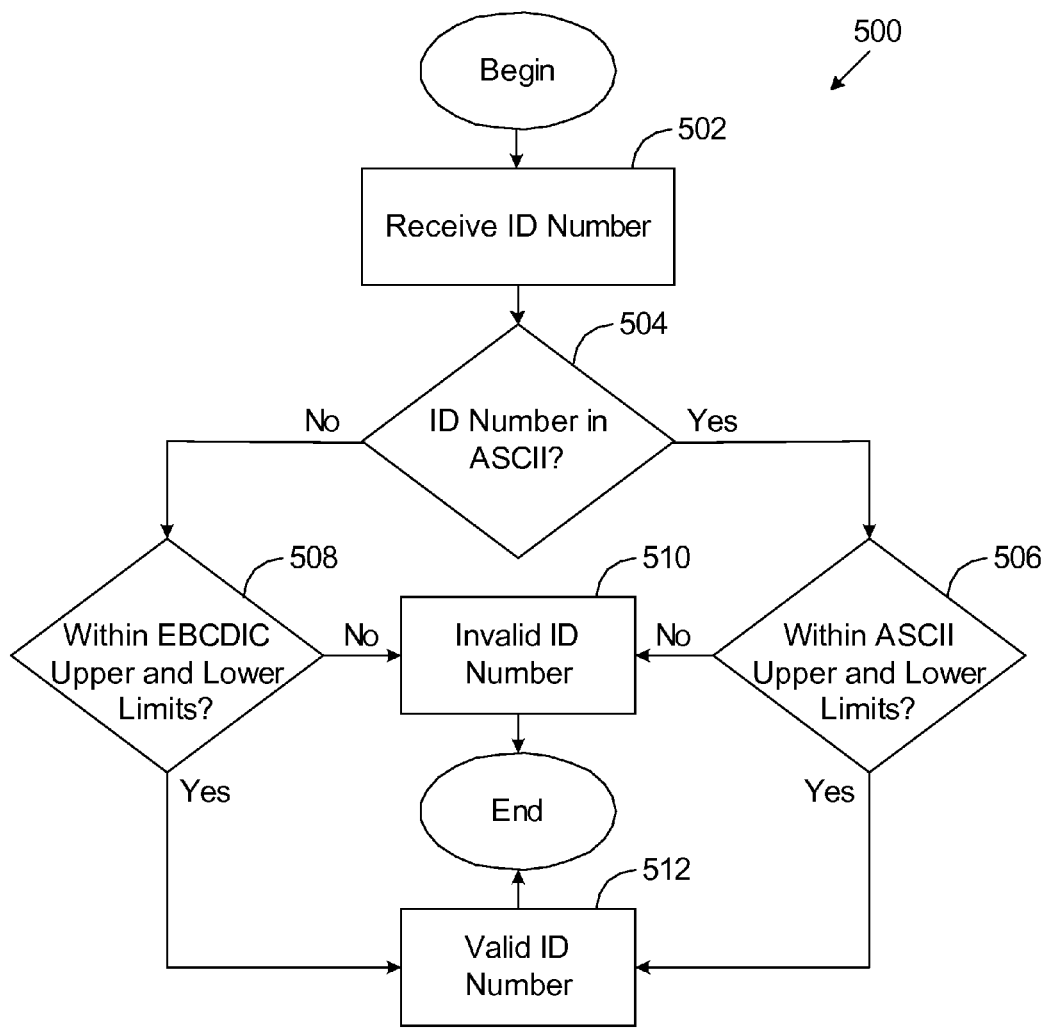
FIG. 5 illustrates an exemplary method for validating expanded reference numbers according to the disclosed embodiments.

FIG. 5 illustrates an exemplary method 500 that may be used to determine whether the expanded employee ID number is in the allowed range. The method begins at step 502, where the ID expansion utility 220 receives an expanded employee ID number from one of the applications 102 and 104. At step 504, the ID expansion utility 220 determines whether the expanded employee ID number is in ASCII or EBCDIC. In most embodiments, this information is provided to the ID expansion utility 220 by the invoking application 102 or 104. If in ASCII, then at step 506, the ID expansion utility 220 determines whether the expanded employee ID number is within the ASCII lower and upper limits, namely, "00001" and "Z9999." If in EBCDIC, then at step 508, the ID expansion utility 220 determines whether the expanded employee ID number is within the EBCDIC lower and upper limits, namely, "A0001" and "99999."

If either of the determinations in steps 506 and 508 is negative, then at step 510, the ID expansion utility 220 informs the invoking application 102 or 104 that the expanded employee ID number is invalid or otherwise outside the allowed range. If either of the determinations in steps 506 and 508 is positive, then at step 512, the ID expansion utility 220 informs the invoking application 102 or 104 that the expanded employee ID number is valid or otherwise within the allowed range. Of course, it is possible for those having ordinary skill in the art to adapt the ID expansion utility 220, as well as the method 500, for use with other coding standards besides ASCII and EBCDIC as needed.

Furthermore, in some embodiments, instead of allowing text to be used only in the lead position, additional positions in the employee ID number may also contain text. In general, for a data storage format having a fixed number of bytes, the disclosed embodiments allow the data storage format to support a reference number having both a text portion and a numeric decimal portion. The text portion may contain any number of letters, the letters occupying consecutive leading bytes, so long as the highest possible value for the numeric portion can be contained in the remaining bytes as a positive binary number. An exemplary implementation of these embodiments is illustrated below in Table 7.

TABLE 7

| 4 Bytes (7 digits) | 5 Bytes (9 digits) |
|---|---|
| 0000000 | 000000001 |
| ... | ... |
| 9999999 | 999999999 |
| A000001 | A00000001 |
| ... | ... |
| Z999999 | Z99999999 |
| AA00001 | AA000001 |
| ... | ... |
| AA32767 | AA8388607 |
| AB00001 | AB000001 |
| ... | ... |
| AB32767 | AB8388607 |
| ... | ... |
| ZZ32767 | ZZ8388607 |
| ... | ... |

While the detailed description has been described with reference to one or more particular embodiments, those skilled in the art will recognize that many changes may be made thereto without departing from the spirit and scope of the description. Therefore, each of the foregoing embodiments and obvious variations thereof is contemplated as falling within the scope of the claimed subject matter, which is set forth in the following claims.

What is claimed is:

1. A method of generating a reference number in an enterprise, the method comprising:
    generating a text part for said reference number;
    obtaining a numerical equivalent of said text part;
    generating a decimal part for said reference number;
    converting said decimal part and said numerical equivalent of said text part to separate hexadecimal numbers;
    storing said hexadecimal numbers of said decimal part and said numerical equivalent of said text part in a fixed-length compressed number format, said numerical equivalent of said text part occupying a leading portion of said fixed-length compressed number format and said decimal part occupying a remaining portion of said fixed-length compressed number format; and
    making said reference number available to said enterprise.

2. The method according to claim 1, wherein said fixed-length compressed number format is a binary coded decimal format having a fixed number of bytes, said numerical equivalent of said text part occupying one or more most-significant-bytes and said decimal part occupying all remaining bytes.

3. The method according to claim 1, further comprising converting said decimal part and said numerical equivalent of said text part to separate binary numbers.

4. The method according to claim 3, wherein a highest possible value for said decimal part produces a positive binary number.

5. The method according to claim 1, wherein said text part of said reference number consists of uppercase letters.

6. The method according to claim 1, wherein said reference number includes one or more of the following: an employee ID number, a social security number, a product inventory number, and a bank account number.

7. A system for generating a reference number in an enterprise, the system comprising:
    a processor operable to execute instructions;
    a memory device storing data including instructions operable on the processor to manage one or more subsystems, the instructions operable to manage:
        at least one subsystem configured to generate a text part for said reference number;
        at least one subsystem configured to obtain a numerical equivalent of said text part;
        at least one subsystem configured to generate a decimal part for said reference number;
        at least one subsystem configured to convert said decimal part and said numerical equivalent of said text part to separate hexadecimal numbers;
        at least one subsystem configured to store said hexadecimal numbers of said decimal part and said numerical equivalent of said text part in a fixed-length compressed number format, said numerical equivalent of said text part occupying a leading portion of said fixed-length compressed number format and said decimal part occupying a remaining portion of said fixed-length compressed number format; and
        at least one subsystem configured to make said reference number available to said enterprise.

8. The system according to claim 7, wherein said fixed-length compressed number format is a binary coded decimal format having a fixed number of bytes, said numerical equivalent of said text part occupying one or more most-significant-bytes and said decimal part occupying all remaining bytes.

9. The system according to claim 7, further comprising at least one subsystem configured to convert said decimal part and said numerical equivalent of said text part to separate binary numbers.

10. The system according to claim 9, wherein a highest possible value for said decimal part produces a positive binary number.

11. The system according to claim 7, wherein said text part of said reference number consists of uppercase letters.

12. The system according to claim 7, wherein said reference number includes one or more of the following: an employee ID number, a social security number, a product inventory number, and a bank account number.

13. A physical computer-readable medium comprising computer-readable instructions for generating a reference number in an enterprise, the computer-readable instructions comprising:
    generating a text part for said reference number;
    obtaining a numerical equivalent of said text part;
    generating a decimal part for said reference number;
    converting said decimal part and said numerical equivalent of said text part to separate hexadecimal numbers;
    storing said hexadecimal numbers of said decimal part and said numerical equivalent of said text part in a fixed-length compressed number format, said numerical equivalent of said text part occupying a leading portion of said fixed-length compressed number format and said decimal part occupying a remaining portion of said fixed-length compressed number format; and making said reference number available to said enterprise.

14. The computer-readable instructions according to claim 13, wherein said fixed-length compressed number format is a binary coded decimal format having a fixed number of bytes, said numerical equivalent of said text part occupying one or more most-significant-bytes and said decimal part occupying all remaining bytes.

15. The computer-readable instructions according to claim 13, further comprising computer-readable instructions for converting said decimal part and said numerical equivalent of said text part to separate binary numbers.

16. The computer-readable instructions according to claim 15, wherein a highest possible value for said decimal part produces a positive binary number.

17. The computer-readable instructions according to claim 13, wherein said text part of said reference number consists of uppercase letters.

18. The computer-readable instructions according to claim 13, wherein said reference number includes one or more of the following: an employee ID number, a social security number, a product inventory number, and a bank account number.

* * * * *